(12) United States Patent
Gravina

(10) Patent No.: US 10,605,333 B2
(45) Date of Patent: Mar. 31, 2020

(54) TRANSMISSION DEVICE FOR DIVIDING THE TORQUE BETWEEN TWO COAXIAL GEARS, IN PARTICULAR FOR A PLANETARY GEAR TRAIN FOR AERONAUTICAL APPLICATIONS

(71) Applicant: GE Avio S.r.l., Rivalta di Torino (IT)

(72) Inventor: Michele Gravina, Minervino Murge (IT)

(73) Assignee: GE Avio S.R.L., Rivalta di Torino (IT)

( * ) Notice: Subject to any disclaimer, the term of this patent is extended or adjusted under 35 U.S.C. 154(b) by 65 days.

(21) Appl. No.: 16/035,734

(22) Filed: Jul. 16, 2018

(65) Prior Publication Data
US 2019/0024756 A1    Jan. 24, 2019

(30) Foreign Application Priority Data

Jul. 21, 2017   (EP) ..................................... 17425078

(51) Int. Cl.
*F16H 1/46* (2006.01)
*F16H 1/28* (2006.01)
*F16D 3/78* (2006.01)

(52) U.S. Cl.
CPC ............... *F16H 1/46* (2013.01); *F16D 3/78* (2013.01); *F16H 1/2845* (2013.01); *F16H 2001/289* (2013.01)

(58) Field of Classification Search
None
See application file for complete search history.

(56) References Cited

U.S. PATENT DOCUMENTS 2,855,767 A * 10/1958 Åhlén ....................... F16D 3/77
                                                                              464/98
3,401,580 A    9/1968 Sigg
(Continued)

FOREIGN PATENT DOCUMENTS

AT      253315 B  *  4/1967  ............... F16H 1/22
CH    669020 A5    2/1989
(Continued)

OTHER PUBLICATIONS

European Search Report dated Feb. 8, 2018 which was issued in connection with EP17425078.7 which was Filed on Jul. 21, 2017.

*Primary Examiner* — Dirk Wright
(74) *Attorney, Agent, or Firm* — Dority & Manning, P.A.

(57) ABSTRACT

A transmission device to divide torque between gears. The device comprising a coaxial motion input member and transmission members and comprising shafts having gears at an axial end. Flanges which project radially outwards from the shafts, at the opposite axial end with respect to the gears, are axially facing and arranged abutting against each other, and are fixed to the motion input member to divide the torque transmitted by the motion input member between the flanges. The second shaft being axially hollow. The first shaft comprising a first intermediate portion having an outside diameter smaller than the inside diameter of the second shaft and housed at least with radial clearance in the second shaft. The flanges comprise respective portions configured to deform under the action of forces acting between the motion input member and the gears to enable a fluctuation of the shafts with respect to an axis.

10 Claims, 4 Drawing Sheets

(56) References Cited

U.S. PATENT DOCUMENTS

| | | | | |
|---|---|---|---|---|
| 4,133,187 A * | 1/1979 | Wildhaber | ................ | F16D 3/77 |
| | | | | 464/91 |
| 4,411,634 A * | 10/1983 | Hammelmann | .......... | F16D 3/74 |
| | | | | 464/91 |
| 5,899,813 A * | 5/1999 | Bunce | ....................... | F16D 3/77 |
| | | | | 464/99 |
| 6,764,405 B2 * | 7/2004 | Kundermann | ............ | F16D 1/06 |
| | | | | 464/74 |
| 8,591,345 B2 * | 11/2013 | Stocco | ..................... | F16D 3/72 |
| | | | | 464/99 |
| 9,382,968 B2 * | 7/2016 | Paulson | .................... | F16D 3/79 |
| 10,400,860 B2 * | 9/2019 | Pinnekamp | ................ | F16H 1/46 |
| 2018/0051776 A1 * | 2/2018 | Klein-Hitpass | ....... | F16H 1/2845 |
| 2019/0024755 A1 * | 1/2019 | Gravina | ................. | B23P 15/14 |

FOREIGN PATENT DOCUMENTS

| | | | | |
|---|---|---|---|---|
| EP | 1113193 A2 | 7/2001 | | |
| EP | 1113193 A3 | 8/2001 | | |
| EP | 2339208 A1 | 6/2011 | | |
| EP | 2998615 A3 | 8/2016 | | |
| FR | 1457945 A * | 11/1966 | ........... | F16H 1/2818 |
| GB | 1072754 A * | 6/1967 | ............... | F16H 1/22 |
| GB | 1114186 A * | 5/1968 | ........... | F16H 1/2818 |
| WO | 9814711 A1 | 4/1998 | | |

* cited by examiner

TRANSMISSION DEVICE FOR DIVIDING THE TORQUE BETWEEN TWO COAXIAL GEARS, IN PARTICULAR FOR A PLANETARY GEAR TRAIN FOR AERONAUTICAL APPLICATIONS

BACKGROUND OF INVENTION

The present invention relates to a transmission device for dividing the torque between two coaxial gears, in particular for a planetary gear train for aeronautical applications.

As is known, in the field of aeronautical engines planetary gear trains are widely used to transmit motion and convert power between a turbo power unit (with high speed and low torque) and at least one propulsive element (with high torque and low speed), as they implement such function very efficiently while being lightweight and compact.

One known solution is described in European patent EP1113193 and comprises an input shaft and an output shaft, which are coaxial to one another along an axis, rotate about said axis and are coupled to one another by means of a planetary gear train. Said gear train has a planetary carrier or gear carrier structure, which supports two sets of planet gears. Each of the two sets of planet gears meshes with a respective sun gear, made to rotate by the input shaft.

The two sets of planet gears define two stages in which the torque from the input shaft is divided and follows separate torque transmission paths. In this way, the loads transmitted between the teeth of the gear train are lower than when the torque is transmitted to a single set of planets. Thus, the solution achieved is relatively compact, with no reduction in the overall power generated by the gear train.

The torque from the input shaft is transmitted and divided between the two sun gears by means of a transmission device comprising two hollow transmission shafts, which are coaxial to the input shaft and comprise respective intermediate portions fitted one inside the other and movable in relation to one another. The sun gears are formed integrally on a respective axial end of said transmission shafts. At the opposite axial end, instead, the two transmission shafts end with respective flanges, which axially support one another and are fixed to a flange of the input shaft, so as to define a transmission coupling that causes both shafts to rotate. Therefore, when the torque is transmitted from the flange of the input shaft to the other two flanges, it is automatically divided between the two transmission shafts, according to the relative torsional rigidity between the two torque paths and the manufacturing and assembly tolerances of the device. Indeed, three conditions must be met in order for the loads to be distributed evenly across the gears and across the bearings of the gear train:

(i) the rigidity of the two torque paths must be perfectly balanced;

(ii) maximum precision must be guaranteed in the angular alignment (angular phasing) of the two sun gears; and (iii) the teeth of the two sun gears must be equally spaced angularly about all 360°.

In use, the forces acting between the turbo power unit and the propulsive element could take the turbo power unit and the propulsive element out of alignment such as to affect the functionality and duration of the planetary gear train.

For that purpose, a known solution envisages the use of transmission shafts the length of which is much greater than the diameter thereof so that they are able to withstand any misalignment between the turbo power unit and the propulsive element, and prevent the transmission of such misalignment to the planetary gear train. However, this solution clearly has very large axial dimensions.

Therefore the need is felt to improve the solutions known in the prior art, of the type described above, in order to reduce their axial dimensions while preserving the capacity of the transmission shafts to absorb any misalignment between the turbo power unit and the propulsive element.

The purpose of the present invention is to produce a transmission device for dividing the torque between two coaxial gears, in particular for a planetary gear train for aeronautical applications, which satisfies the above need in a simple and economical manner.

According to the invention, this purpose is achieved with a transmission device for dividing the torque between two coaxial gears, in particular for a planetary gear train for aeronautical applications, as disclosed in claim 1.

BRIEF DESCRIPTION OF THE DRAWINGS

In order to better understand the present invention, some non-limiting embodiments thereof will now be described purely by way of example, with reference to the accompanying drawings, in which.

DETAILED DESCRIPTION OF THE INVENTION

Figure 1:
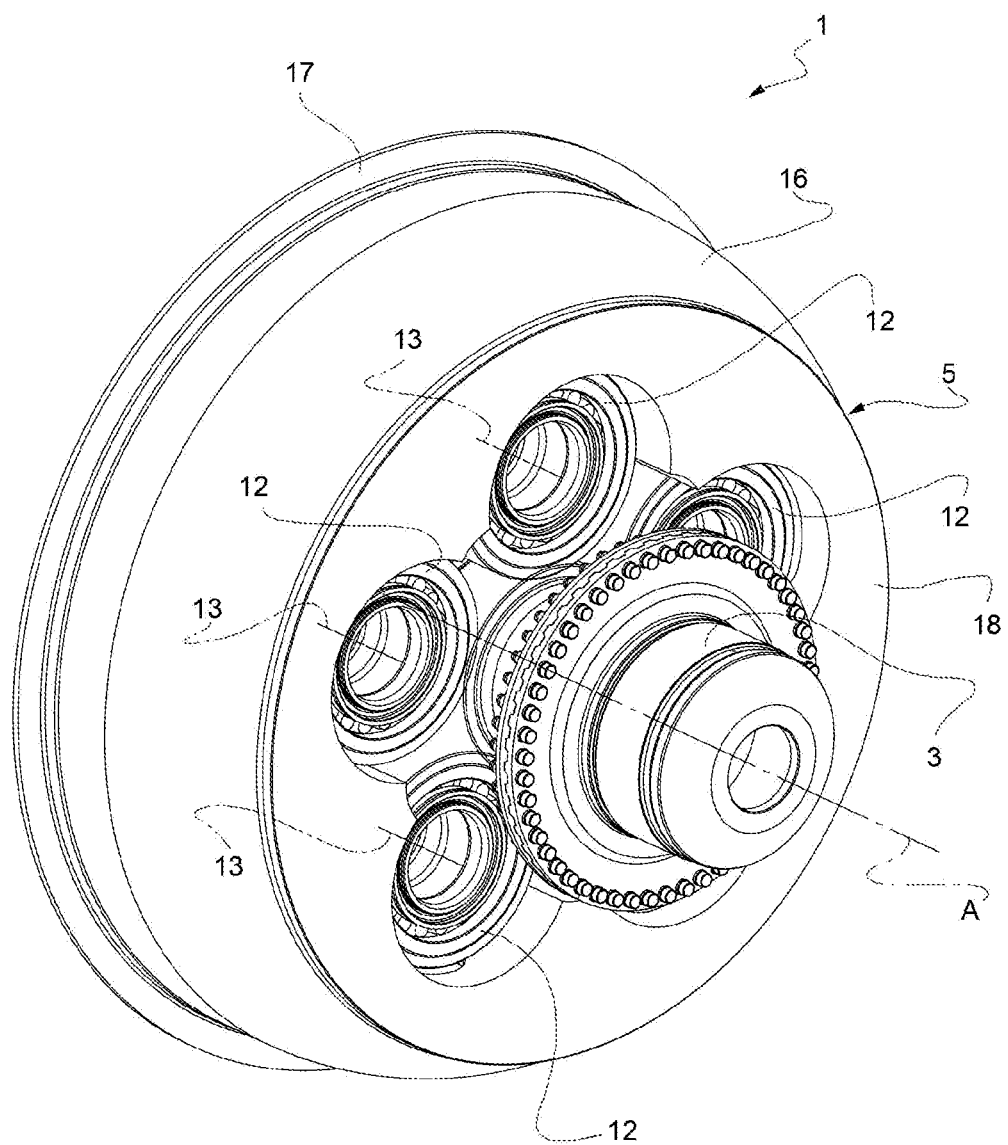
FIG. 1 is a perspective view of a planetary gear train for aeronautical applications provided with an embodiment of the transmission device according to the present invention, with some parts removed for the sake of clarity.
Figure 2:
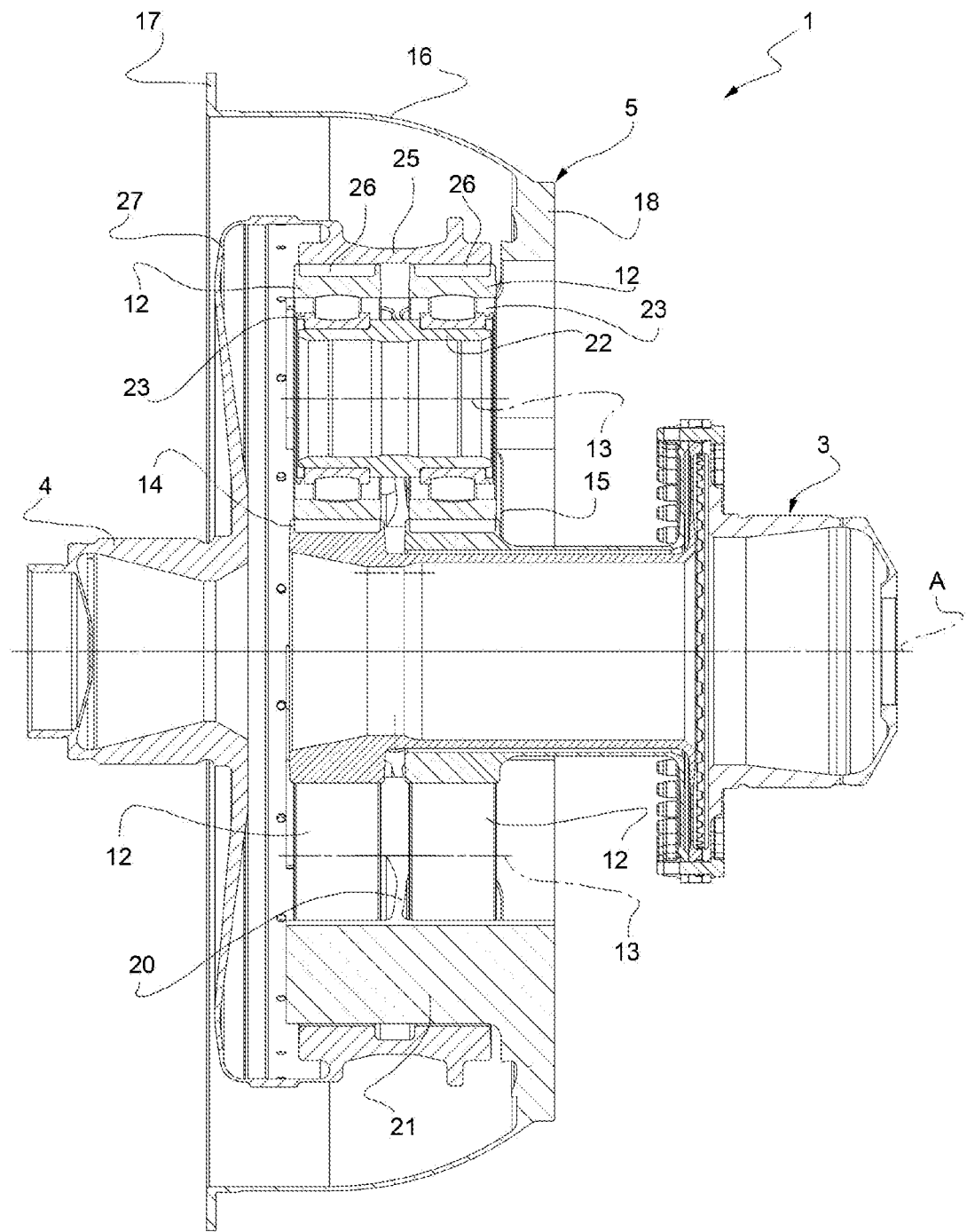
FIG. 2 is a cross section, along a diametrical viewing plane, of the planetary gear train of FIG. 1.

With reference to FIG. 1, reference number 1 indicates a planetary gear train for transmitting rotational motion from an input member 3, which can be connected to a power unit (not illustrated) defined for example by a gas turbine engine, to an output member 4, which can be connected to a user (not illustrated) defined for example by a propeller.

The members 3 and 4 are coaxial to each other along an axis A and rotate about said axis A each at a different speed. The gear train 1 comprises a planetary carrier or gear carrier 5 and a plurality of planet gears 12, which are supported by the planetary carrier 5 so as to rotate about respective axes 13, which are parallel and eccentric with respect to the axis A. The teeth of the planet gears 12 are cylindrical straight teeth.

The planet gears 12 are arranged so as to form two sets, which are arranged on axially opposite sides with respect to a plane of symmetry, orthogonal to the axis A, and define respective torque transmission paths for transmitting respective torque fractions, as will also be described later on in this document.

Each set is formed by at least three planet gears 12 (for example, by five planet gears 12) distributed around the axis A. In particular, the axes 13 of the planet gears 12 of each set are equally spaced angularly with respect to one another about the axis A.

For each of the two sets, the planet gears 12 mesh directly with a respective sun gear. The two sun gears are indicated by reference numbers 14 and 15, they are identical in shape and size and are arranged in positions that are aligned and axially spaced.

Advantageously, the planetary carrier 5 is defined by a monolithic body, i.e., a body formed as a single piece, and comprises a substantially bell-shaped structure 16 which, at one axial end is provided with a fixing element 17, for example a flange. The fixing element 17 defines a coupling to connect the planetary carrier 5 in an angularly fixed manner to a member that is not illustrated, i.e., to another motion output member or to a static structure.

At the opposite axial end to the fixing element 17, the structure 16 comprises an annular portion 18, shaped so as to define semi-circular openings which are coaxial to the planet gears 12 along the axes 13, to permit the assembly of said planet gears 12.

The planetary carrier 5 further comprises an annular plate 20, which is coaxial to the structure 16 along the axis A, is connected to the portion 18 by means of connecting portions 21 arranged angularly between the planet gears 12, and supports the planet gears 12 by means of respective pins 22, which protrude from the plate 20 in opposite directions along the axes 13.

In the specific example, the pins 22 are made as a single piece with the plate 20, so as to form part of the planetary carrier 5. According to an alternative embodiment that is not illustrated, the pins 22 are separate pieces that are fixed to the plate 20, for example by means of an interference coupling. The planet gears 12 are mounted on the respective pins 22 by means of bearings defined by rolling-contact bearings 23.

The gear train 1 further comprises a crown wheel 25, which is coaxial to the planetary carrier 5 and to the members 3 and 4, surrounds the two sets of planet gears 12 and has a pair of internal teeth 26 each of which meshes with the teeth of the planet gears 12 of a respective set. The crown wheel 25 thus reunites the two torque fractions that are transmitted separately by the two sets of planet gears 12.

The crown wheel 25 is fixed with respect to the member 4 and, for example, is connected to the member 4 via a bell-shaped element 27, so as to transmit the overall torque received from the two sets of planet gears 12. The crown wheel 25, the bell-shaped element 27 and the member 4 are parts of a single piece.

Figure 3:
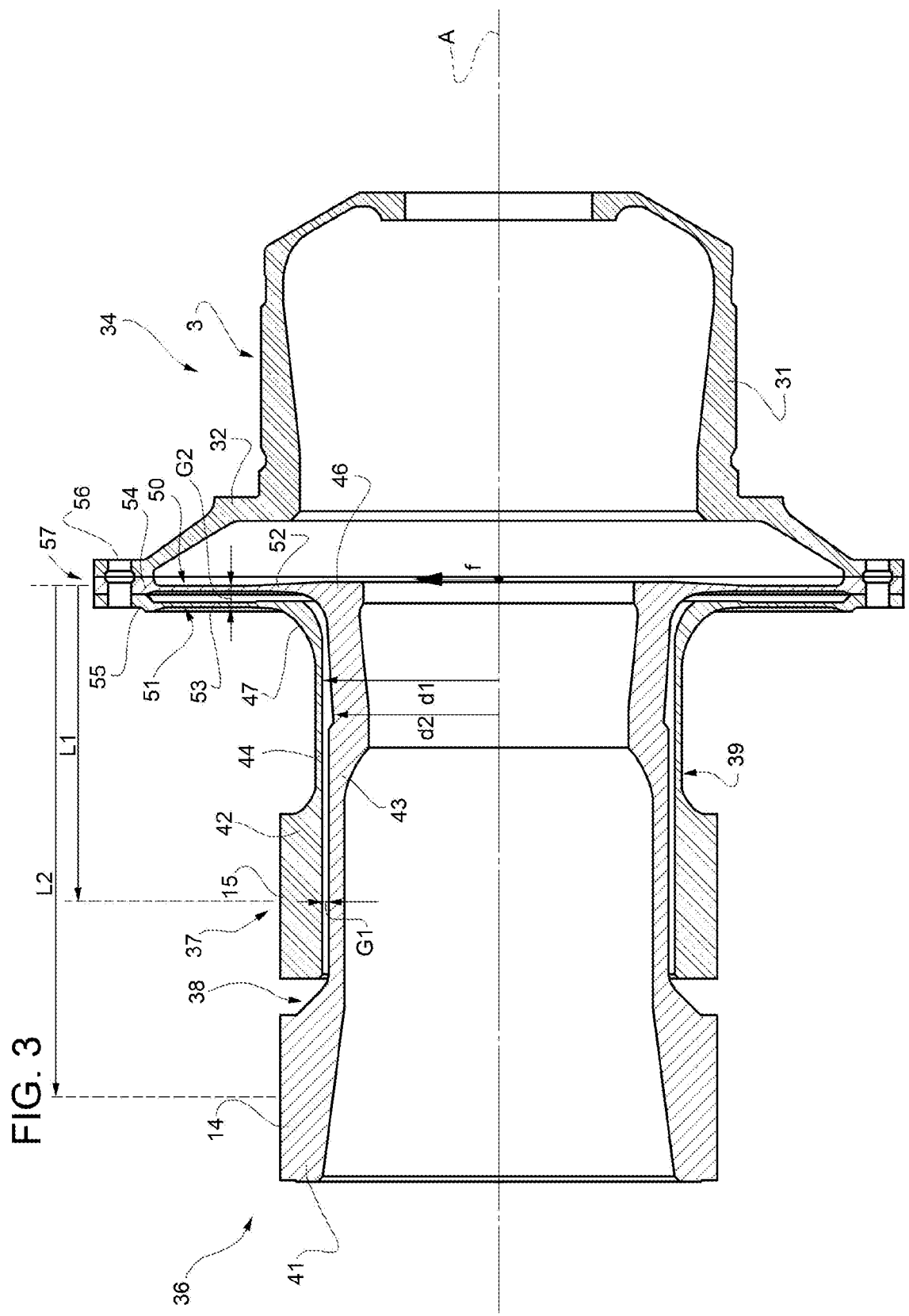
FIG. 3 is a cross section on an enlarged scale of part of the planetary gear train of FIG. 1.

With reference to FIG. 3, the input member 3, in particular, is defined by a hollow flanged body. More in detail, the input member 3 comprises a hollow cylindrical portion 31 that is fixed to said power unit so as to be angularly rotatable and axially fixed. The input member 3 further comprises a flange 32 that radially protrudes outwards from an axial end of the portion 31.

The input member 3 is part of a transmission device 34, which divides the torque from the power unit into two fractions, which are as equal to one another as possible, and transmits said torque fractions to the two respective sets of planet gears via the sun gears 14 and 15.

The device 34 comprises two transmission members 36 and 37, which are coaxial to each other along the axis A, at least in the design condition, and comprise respective transmission shafts 38 and 39. One end of the shafts 38 and 39 is defined by the sun gears 14,15.

The sun gear 14 radially protrudes from an end portion 41 of the shaft 38 and is formed as a single piece with said portion 41. Likewise, the sun gear 15 radially protrudes from an end portion 42 of the shaft 39 and is formed as a single piece with said portion 42.

The shaft 39 is axially hollow, as is the shaft 38 which comprises an intermediate portion 43 having an outside diameter smaller than the inside diameter of the shaft 39 and is housed in the shaft 39 with radial clearance, as described more fully later on in this document.

The shaft 38 is also axially hollow and further comprises an intermediate portion 44 that axially joins the portion 43 to the portion 41, is outside of the shaft 39 and has an outside diameter smaller than the inside diameter of the shaft 39.

At the opposite ends with respect to the gears 14 and 15, the shafts 38 and 39 end with respective coupling portions 46 and 47, facing and spaced from one another. The members 36 and 37 further comprise respective flanges 50 and 51, which radially protrude outwards with respect to the portions 46 and 47. According to the embodiments illustrated in the accompanying figures, the flange 50 is formed as a single piece with the portion 46 of the shaft 38 and/or the flange 51 is formed as a single piece with the portion 47 of the shaft 39.

The flanges 50 and 51 comprise respective internal annular portions 52 and 53, which are spaced apart from each other, and respective external annular portions 54 and 55, which are arranged axially in contact with each other and are fixed to the flange 32 of the input member 3, for example by means of a plurality of screws or bolts 56, so as to define a joint 57 that transmits and divides the torque received from the power unit between the two transmission members 36 and 37.

Two reference pins (not illustrated) are used to assure adequate coaxiality of the shafts 38 and 39 during their assembly and the correct angular phasing of the teeth of the sun gears. Said pins are angularly spaced by 180°, they are arranged at the interface between the annular portions 54 and 55 and are fitted in axial holes obtained in the angular spaces between two adjacent bolts.

According to the embodiment that is illustrated, the shaft 38 is manufactured by means of a welding process. However, it could be made of several parts that are assembled together.

Advantageously the internal portions 52 and 53 of the flanges 50 and 51 are configured so as to be able to deform under the action of the forces acting on the shafts 38 and 39 and so enable a fluctuation, within a predetermined maximum deflection, of the end portions 41 and 42 of the shafts 38, 39.

In particular, the deformation of the portions 52, 53 enables the shafts 38, 39 to rotate about any axis perpendicular to the axis A.

Said internal portions 52, 53 are of variable thickness in a radial direction and comprise a diametrical section that is tapered from a maximum thickness, where it is fixed to the coupling portions 46, 47 to a minimum thickness, where it is fixed to the external portions 54, 55.

The internal portions 52, 53 may be "tapered contoured diaphragms" or "shaped diaphragms", so as to achieve a so-called "disc coupling".

The term "shaped diaphragm" usually refers to a substantially flat element with a diametrical cross section configured to make said diaphragm highly deformable thanks to the optimum distribution of the internal stress mainly due to torsion, bending and the axial load on the component.

The thickness, $S_1$, $S_2$, of the internal portions 52, 53 is variable with the radius $R_1$, $R_2$ thereof. The thickness $S_1$, $S_2$ varies according to an exponential law of the type:

$$S = S_0 * (R_0/R)^2$$

in order to achieve a uniform distribution of the stress due to the torsion of the component and reducing the thickness to a minimum.

In the above equation the values $S_0$ and $R_0$ are known constants. In particular, $S_0$ is the thickness at a radius $R_0$ and has a minimum value at the outside radii compatible with the stress within the component.

Advantageously, between the shafts 38 and 39 there is a radial clearance $G_1$ configured to allow the fluctuation of the end portions 41, 42 of the shafts 38 and 39 without any interference between them. The radial clearance $G_1$ is a function of the maximum deflection and of the geometry of the shafts 38, 39.

Specifically, said clearance $G_1$ is envisaged between an internal annular surface 38a of the shaft 38 and an external annular surface 39a of the shaft 39 and it has a constant value along the length of the shafts 38 and 39.

As already mentioned, the maximum radial clearance $G_1$ is a function of the maximum deflection of the end portions 41, 42 of said shafts 38, 39, and of the geometry of the shafts.

With reference to FIG. 3, in a section in which both the external surface of the shaft 38 and the internal surface of the shaft 39 are cylindrical, the radial clearance $G_1$ follows the approximated law:

$$G_1 \approx (d_1-d_2)/2 \pm x\, f(1/L_1-1/L_2) \pm f(L_1-L_2)/L_2$$

where:
$d_1$ is the inside diameter of the shaft 39
$d_2$ is the outside diameter of the shaft 38
x is the axial position of interest along the shaft
f is the deflection applied to the flanges 55 and 56
$L_1$ is the length of the shaft 39 from the point of application of the deflection to the centre of the teeth 15
$L_2$ is the length of the shaft 38 from the point of application of the deflection to the centre of the teeth 14.

Again with reference to FIG. 3, positive signs are used to calculate the clearances in the upper part, i.e., the side towards which the deflection is applied, whereas negative signs are used to calculate the clearances in the lower part, i.e., the side opposite to that of the direction of application of the deflection.

Advantageously, there is an axial clearance $G_2$ between the internal portions 52, 53 configured to allow an axial deformation of the internal portions 52, 53.

The radial clearance $G_1$ and the axial clearance $G_2$ are of the same size, alternatively they may be different, the clearance $G_2$ is greater than $G_1$.

Conveniently, the radial clearance $G_1$ and the axial clearance $G_2$ follow on from one another without any interruption since there is a clearance between the coupling portions 46 and 47 provided to allow the fluctuation of the shafts 38, 39.

Figure 4:
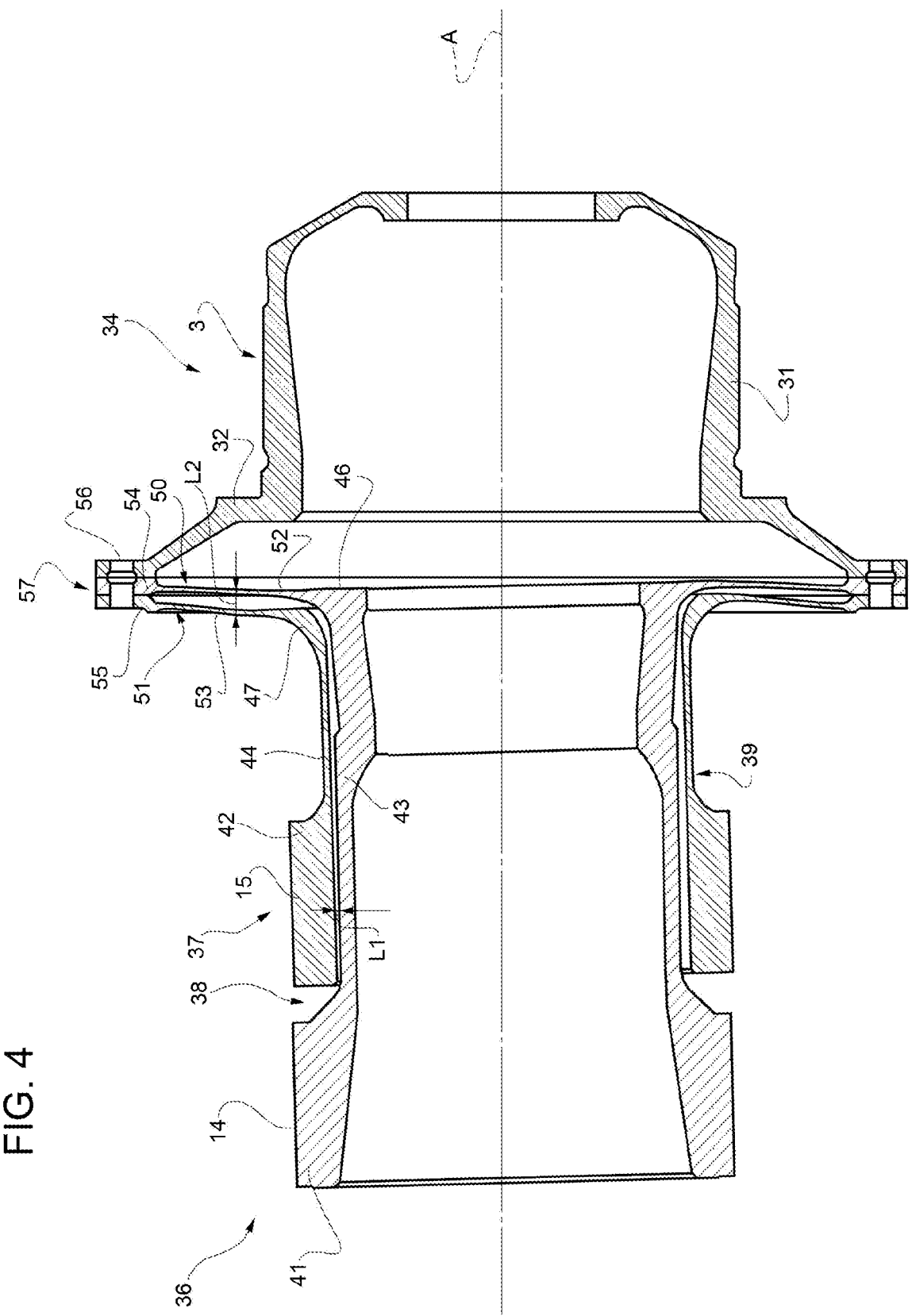
FIG. 4 is a view on an enlarged scale of part of the planetary gear train of FIG. 1 in a deformed condition.

In use, as illustrated in FIG. 4, the forces acting between the input member 3 and the output member 4 tend to deform the internal portions 52, 53 which, in this way, allow the movement of the shafts 38 and 39.

In particular the shafts 38 and 39 are constrained by the gears 14, 15 at the end portions 41, 42 and by the external annular portions 54, 55 defining the joint 57. When the input member and the gears 14, 15 are taken out of alignment, the fact that the internal portions 52, 53 of the flanges are deformable means that the shafts 38, 39 are able to fluctuate and act substantially like a beam attached to the external annular portions 54, 55.

Since the radial clearance $G_1$ is appropriately sized according to the geometry of the shafts and the extent of the deflection, the shafts 38 and 39 never interfere with each another.

(i) The advantages afforded by the transmission 1 provided according to the present invention are apparent from an examination of the characteristics thereof.

The use of deformable portions 52, 53 allows the shafts 38, 39 to move should the input member 3 and the output member 4 be taken out of alignment, making it possible to reduce the axial dimensions of the transmission 1 and ensuring correct operation.

The use of deformable portions 52, 53 of variable thickness in a radial direction, and formed as shaped profiles, enables such deforming properties to be achieved in a simple and economical manner.

The presence of the clearances $G_1$ and $G_2$, of a predetermined size according to the maximum allowable deflection of the shafts 38, 39, enables the aforesaid movement of the shafts 38, 39 without them interfering with each other.

It is clear that modifications and variations may be made to the transmission 1 described and illustrated herein without departing from the scope of the present invention as set forth in the appended claims.

For example, the portions 52, 53 could be made so as to deform in a different way to that described here, or the sizes of the clearances $G_1$, $G_2$ could differ from those indicated here.

What I claim is:

1. A transmission device to divide the torque between two coaxial gears, in particular for a planetary gear train for aeronautical applications, the device comprising a motion input member and a first and a second transmission member, which are coaxial to each other and to said motion input member along a longitudinal axis (A) and comprise:
   a first and, respectively, a second shaft having a first gear and, respectively, a second gear at an axial end;
   a first and, respectively, a second flange, which project radially outwards from said first and second shaft, at the opposite axial end with respect to said first and second gear, are axially facing and arranged abutting against each other, and are fixed to said motion input member so as to divide the torque transmitted by said motion input member between said first and second flange;
   at least said second shaft being axially hollow; said first shaft comprising a first intermediate portion having an outside diameter smaller than the inside diameter of said second shaft housed at least with radial clearance (G1) in said second shaft;
   wherein said first and second flange comprise respective portions configured so as to deform under the action of forces acting between said motion input member and said first and second gear so as to enable a fluctuation, within a predetermined maximum deflection, of said first and second shaft with respect to an axis perpendicular to said axis (A).

2. The transmission device according to claim 1, wherein said portions are of variable thickness in a radial direction.

3. The transmission device according to claim 1, wherein said portions are shaped diaphragms.

4. The transmission device according to claim 2, wherein said portions comprise a section substantially tapered in a radial direction, said section passing from a maximum thickness, in the region of the projection of said flanges from said shafts, to a minimum thickness, in the region of the fixing to said motion input member.

5. The transmission device according to claim 4, wherein said variation between said minimum thickness and said maximum thickness follows an exponential law.

6. The transmission device according to claim 4, wherein said variation between said minimum thickness and said maximum thickness follows a law S=S0*(R0/R)2, where S0 and R0 are set constants.

7. The device according to claim 1, wherein said radial clearance (G1) is sized to allow the movement of said shafts within said predetermined maximum deflection without said shafts touching each other.

8. The device according to claim 1, wherein between said first and second flange there is an axial clearance (G2) sized to allow the axial deformation of said portions so that said flanges do not touch each other.

9. The device according to claim 7, wherein said radial clearance (G1) and said axial clearance (G2) are the same.

10. The transmission device according to claim 7, wherein said axial clearance (G1) is greater than said radial clearance (G2).

* * * * *